A. C. HULSE & J. S. CRUM.
Pruning Implements.
No. 142,915.  Patented September 16, 1873.
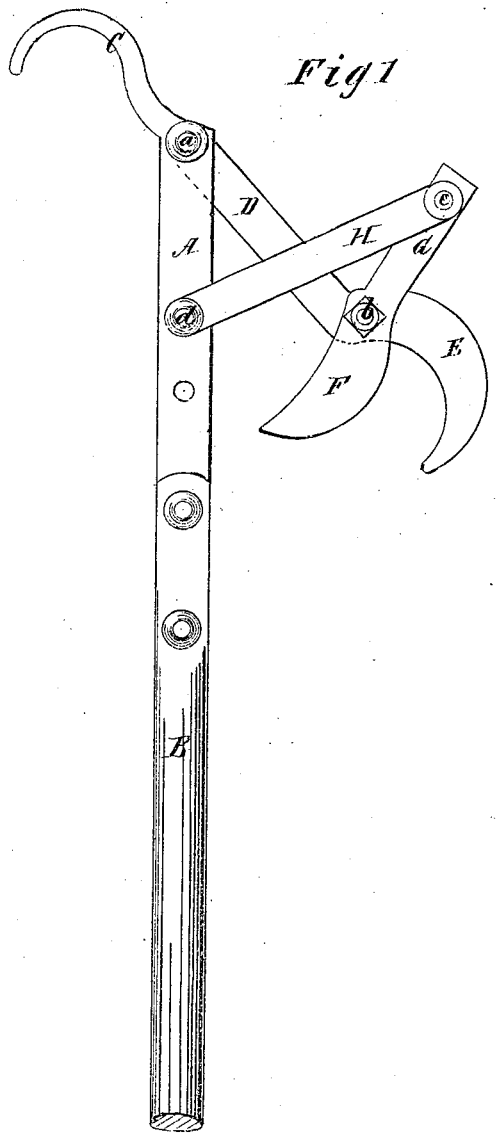
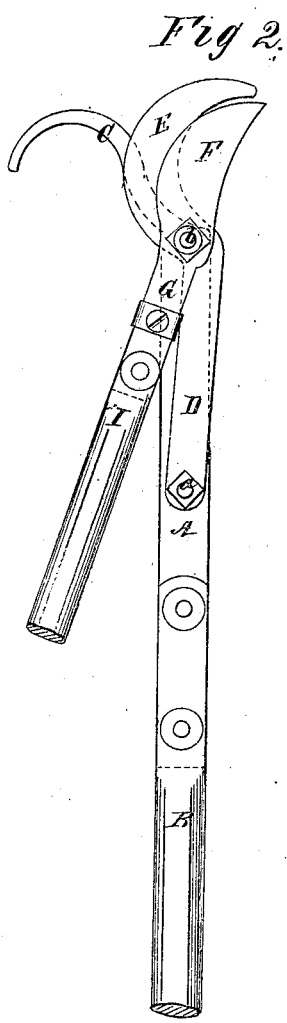

UNITED STATES PATENT OFFICE.

ABRAHAM C. HULSE AND JOSEPH S. CRUM, OF PALMYRA, ILLINOIS.

IMPROVEMENT IN PRUNING IMPLEMENTS.

Specification forming part of Letters Patent No. 142,915, dated September 16, 1873; application filed July 31, 1873.

*To all whom it may concern:*

Be it known that we, ABRAHAM C. HULSE and JOSEPH S. CRUM, of Palmyra, in the county of Macoupin and State of Illinois, have invented a new and useful Improvement in Pruning-Shears; and we do hereby declare the following to be a full, clear, and exact description of the same, reference being had to the accompanying drawing, forming part of this specification.

This invention relates to an improvement in pruning-shears, designed to produce an effective and convenient instrument adapted for a more general use under different circumstances; and to this end the invention consists in an improved construction of pruning-knives, as hereinafter described and pointed out in the claim, so that the same article may be readily changed from a tree to a shrubbery pruner, or vice versa.

In the accompanying drawing, Figures 1 and 2 are side elevations, the former showing the jaws of tool open, and the latter showing them shut.

A designates a bar or stock, carrying at its lower end a handle, B, of any suitable length, detachably secured to the bar by bolts or other devices. The upper end of the bar A is formed into a hook, C, which is designed for use in drawing limbs from remote places to the shears, and for disengaging severed limbs arrested in the tree. To the upper end of the bar A is pivoted, by a fulcrum pin or bolt, *a*, an arm, D, which carries at its outer end a hook-shaped jaw, E. A cutter or knife, F, with a curved or convex cutting-edge, is pivoted to the jaw E by a bolt, *b*, and is provided with an extension or shank, G, which is at its outer end connected by a pivot pin or bolt, *c*, with the upper end of a link or arm, H, pivoted at its lower end to the bar A by a fulcrum-pin, *d*.

By this mode of connecting the parts E F with the handle A by the link H, the instrument becomes a shrubbery-pruner, but by removing the parts D, E, F, G, and H, dropping the latter and bolting fast the part D E to handle A, with the part E just above the end of A, while the part F G is pivoted near the blade to the upper part of handle A, and provided with a handle, I, for itself, the instrument is converted into a tree-pruner.

Having thus described our invention, what we claim as new, and desire to secure by Letters Patent is, viz:

A pruning-knife consisting of the handle A with a series of screw-holes, the removable strap H, and parts D E F G, and the supplemental handle I, severally constructed and arranged, as shown and described, with respect to each other, so that the device may be converted into a double-handled pruner, in the manner specified.

ABRAHAM C. HULSE.
JOSEPH S. CRUM.

Witnesses:
RICHARD B. BOOKER,
WILLIAM E. WEST.